April 23, 1929.  W. TAPLEY  1,710,594
INSTRUMENT FOR GAUGING THE RATE OF ACCELERATION
OR DECELERATION OF VEHICLES
Filed Nov. 14, 1928

WITNESSES

INVENTOR
W. Tapley
BY
ATTORNEY

Patented Apr. 23, 1929.

1,710,594

UNITED STATES PATENT OFFICE.

WILLIAM TAPLEY, OF REDBRIDGE, ENGLAND.

INSTRUMENT FOR GAUGING THE RATE OF ACCELERATION OR DECELERATION OF VEHICLES.

Application filed November 14, 1928, Serial No. 319,374, and in Great Britain August 9, 1928.

My present invention relates to an instrument for gauging the rate of acceleration or deceleration of vehicles, and it consists of a device which can be set to indicate when any particular rate of acceleration or deceleration has been attained.

In my invention the indicating member is a comparatively light case containing some liquid, or a ball, the liquid or ball being free to run or roll within the case, I support this case on a pivot, and I fix a stop in such position relative to the pivot and case that the latter can rest on the stop at any desired inclination.

I arrange the pivoted case to be mounted on a vehicle so that the pivot is horizontal and at right angles to the direction of motion in which acceleration or deceleration is to be gauged.

In operation, the liquid or ball remains at the lower part of the case until a rate of acceleration or deceleration is attained which corresponds to the particular incline of the case, but when such rate of acceleration or deceleration is attained by the vehicle, the liquid or ball runs or rolls up the case to the higher part, and by its weight causes the case to tilt over about the pivot and thereby to indicate that the rate of acceleration or deceleration, predetermined by the angle of inclination of the case, has been attained.

To gauge acceleration I set the stop in such a position that the lower end of the case is forward, and vice versa for gauging deceleration.

My invention also includes the arrangement of the pivoted case and stop in an outer case with a sight opening, and with a device for returning the inner case to its original position after it has tilted to indicate. I may also provide means for setting the stop to different positions so that the inner case may rest at different desired inclinations. Further, I may also provide a bracket or brackets by which to fix the outer case on the vehicle and in which the outer case can be set at any desired inclination, and I may incorporate a pendulum, or a spirit level in or on the outer case by which the outer case and consequently also the inner case, can be set at any desired inclination conveniently. In order that my invention and the manner in which it is to be performed may be clear, I append drawings, in which:—

Figure 1:
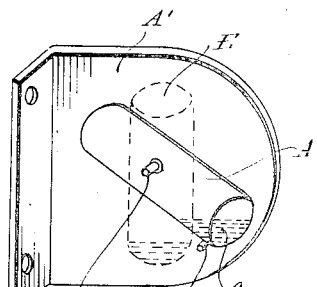
Figure 1 shows a pivoted case containing liquid.

In Fig. 1, a pivoted case A, of cylindrical shape is shown supported by the pivot B on a bracket A'. Some liquid in the lower part of the case is shown dotted at C, and owing to the weight of the liquid, the case when placed in the position shown, rests on the stop D at an inclination determined by the position of the stop in relation to the pivot. The pivot and stop are shown fixed to a plate or bracket which is intended to be mounted on a vehicle in such a position that the pivot is horizontal and at right angles to the direction of acceleration or deceleration to be gauged.

In action, the liquid remains holding the case against the stop until a rate of acceleration or deceleration is attained which is sufficient to cause the liquid to run up the inclined case, but when the rate of acceleration or deceleration corresponding to the inclination at which the case is set, is reached, the liquid runs past the pivot to the higher part of the case and by its weight causes the case to tilt over into the position shown dotted at E.

In the tilted over position E the liquid falls to the end of the case which is now the bottom and the case is consequently held in its new position until it is manually re-set against the stop.

The indication that the pre-determined rate of acceleration or deceleration has been attained is therefore given by the tilting over of the case, and as the case does not return to its original position after the acceleration or deceleration has ceased, the tilted case provides evidence which can be observed at any later convenient time, that the pre-determined rate of acceleration or deceleration was reached.

Figure 2:
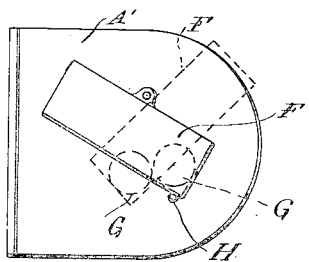
Figure 2 shows a pivoted case containing a ball.

In Fig. 2, a bracket A' supports a pivoted case shown at F which contains a ball shown dotted at G. In the position indicated the weight of the ball causes the case to rest on the stop H.

The action of the ball G is similar to that of the liquid C in Fig. 1, and the indication of any particular rate of acceleration or deceleration having been reached, is given by the tilting of the case.

In the drawings the cases are shown of cylindrical form, the pivots being disposed at the middle of the length of the cases, the case may however be of any shape, and the pivot disposed in any position in relation to the case such that the transference of the liquid or ball by the effect of acceleration or deceleration from a lower part of the case to a higher will cause the case to take up a new position and to remain in such new position.

Figure 3:
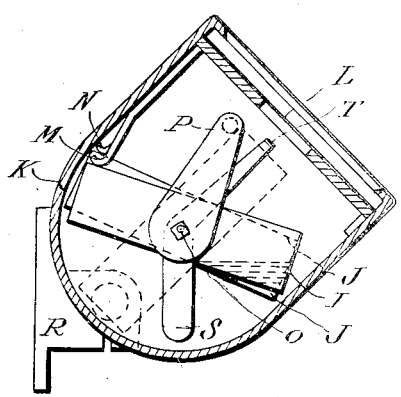
Figure 3 is a side view of an instrument with an outer case, one end of which is removed to show the interior parts.
Figure 4:
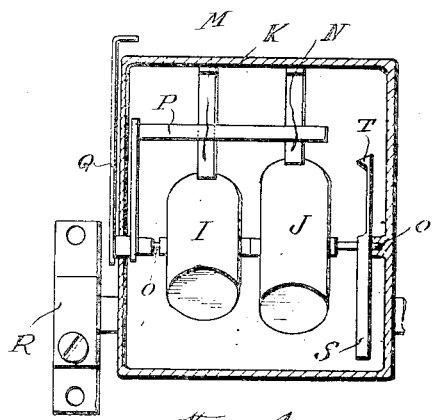
Figure 4 is a front view with the case sectioned to show the interior parts.

In Figs 3 and 4, I show two pivoted tilting cases I and J mounted in an outer case K, having a sight opening at L through which the ends of the cases can be seen after they have tilted to register particular rates of acceleration or deceleration. The cases each contain some liquid and are similar to the case A in Fig. 1. The stops against which the cases rest are shown at M and N, and the cases are supported, and turn on the pivot O. The stops M and N are set in such positions that the two cases rest on them at different inclinations.

In order that the inner tilting cases may be conveniently set back against the stops M and N, I provide an arm P, connected to the lever Q outside the outer case by means of which the cases I and J can be turned on the pivot until they rest on the stops M and N. The arm P also provides a stop against which the pivoted cases will fall when they tilt over to indicate acceleration or deceleration, the arm being set in such a position that the ends of the cases come opposite to the sight opening, through which it is observed that they have tilted.

I also make provision that the stop against which a case rests can be adjusted in relation to the pivot to alter the inclination of the case so that it will tilt over at different desired rates of acceleration or deceleration. For instance I may arrange the stop on an arm connected to an adjusting lever on the outside of the outer case and provide marks on the outer case corresponding to different inclinations of the pivoted case, to which the adjusting lever can be set.

In order that the outer case may be conveniently mounted, and set to a required angle I provide fixing brackets, one of which is shown at R, and I support the outer case in bearings in these brackets so that it can be swivelled. I also incorporate in the instrument a freely suspended pendulum S having an indicator T which will indicate against a mark or marks on the outer case when the latter has been swivelled into the position in which the inner pivoted cases rest on their stops at the inclinations from which they are required to operate.

Figure 5:
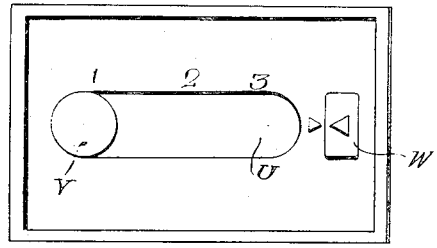
Figure 5 is a front view showing the sight opening.

In Fig. 5, is shown a sight opening U in the front of an instrument having three pivoted tilting cases. The end of one case is shown tilted up into view at V, under the number 1, the other two cases, not shown, rest against stops at different inclinations, consequently three different rates of acceleration or deceleration would be indicated by the instrument. The indicator T attached to the pendulum shown in Fig. 4, may be observed through the sight opening W. My invention therefore provides for an instrument that will indicate when any predetermined rates of acceleration or deceleration have been attained, such indications remaining to be observed after the acceleration or deceleration has ceased.

I am aware that devices are known in which liquid, or balls moving in inclined tubes have been used to indicate acceleration or deceleration, but in all such devices the indication is given by observation of the movement of the liquid or ball, whereas in my invention, the indication is given by the action of the case containing the liquid or ball which action is caused by the transference of weight from one part of the case to another.

I claim:

1. A device for gauging the rate of acceleration or deceleration of vehicles, comprising a case, a movable element normally located in the lower end of the case, means for pivotally mounting the case, said pivot being located in a horizontal plane, a stop located relative to the pivot and adapted to be engaged by one end of the pivotally mounted case when said case is at rest, the inclination of the case being such that under the effect of a particular rate of acceleration or deceleration the movable element in the case will move to the opposite end of the case and cause said case to tilt about the pivot.

2. A device for gauging the rate of acceleration or deceleration of vehicles, comprising a case, a movable element normally located in the lower end of the case, means for pivotally mounting the case, said pivot being located in a horizontal plane, a stop located relative to the pivot and adapted to be engaged by one end of the pivotally mounted case when said case is at rest, the inclination of the case being such that under the effect of a particular rate of acceleration or deceleration the movable element in the case will move to the opposite end of the case and cause said case to tilt about the pivot, an arm adapted to engage the case for moving the same, and means for operating the arm for tilting the case to its original position after it has been tilted to indicated position.

3. A device for gauging the rate of acceleration or deceleration of vehicles, comprising a case, a movable element normally located in the lower end of the case, means for pivotally mounting the case, said pivot being located in a horizontal plane, a stop located relative to the pivot and adapted to be engaged by one end of the pivotally mounted case when said case is at rest, the inclination of the case being such that under the effect of a particular rate of acceleration or deceleration the movable element in the case will move to the opposite end of the case and cause said case to tilt about the pivot, a shell for housing the case, and means for adjustably positioning the stop and having a manipulating means located exteriorly of the housing.

4. A device for gauging rate of acceleration or deceleration of vehicles, comprising a housing having a sight opening, an elongated inner case pivoted intermediate its ends and in the housing, an element freely movable in the case, a stop located relative to the pivot upon which one end of the case is adapted to rest for maintaining the case at an angle to the horizontal, a pendulum provided with an indicator mounted within the housing, said indicator being adapted to point to marks on the housing by which said housing may be set at any desired angle relative to the pendulum, the element in the case being adapted to be moved to the opposite end of the case at a predetermined rate of acceleration or deceleration of the vehicle for causing the case to be tilted and project the opposite end of the case in alignment with the sight opening.

5. A device for gauging the acceleration or deceleration of vehicles comprising a housing having a sight opening, a plurality of cases pivotally mounted within the housing and each containing an element freely movable therein, means for maintaining each case at a predetermined angle relative to the horizontal so that under the effect of different rates of acceleration or deceleration of the vehicle, the elements in the respective cases will move to the opposite end of the cases and cause tilting of said cases on their pivots for placing the opposite end of each in alignment with the sight opening.

WILLIAM TAPLEY.